United States Patent Office
3,782,934
Patented Jan. 1, 1974

3,782,934
SPECTRALLY SENSITIZED ELECTRO-
PHOTOGRAPHIC MATERIAL
Hans Öhlschläger, Cologne, Germany, Theofiel Hubert Ghys, Kontich, and Karel Eugeen Verhille, Hoboken, Belgium, and Helmut Kampfer, Cologne, Germany, assignors to Agfa-Gevaert Aktiengesellschaft, Leverkusen, Germany
No Drawing. Filed Jan. 17, 1972, Ser. No. 218,541
Claims priority, application Germany, Jan. 18, 1971,
P 21 02 175.0
Int. Cl. G03c 5/00
U.S. Cl. 96—1.7     1 Claim

ABSTRACT OF THE DISCLOSURE

Spectrally sensitized electrophotographic layers on the basis of zinc oxide as photoconductive agent which are nearly colorless and stable in storage contain reaction products of 2-methyl- or 4-methyl-quaternary salts of heterocyclic bases with 4-hydroxybenzaldehydes.

The invention relates to the use of styryl dyes for the spectral sensitization of electrophotographic materials which preferably contain zinc oxide as photoconductive agent.

It is already known that photoconductive layers which are sensitive mostly in the ultraviolet region of the spectrum can be sensitized to visible light by the addition of dyes which transmit the radiant energy. Various classes of dyes have been proposed for this purpose, e.g. triphenylmethane dyes, phenolsulphonphthaleins, xanthene dyes and acridine dyes as well as the cyanines, merocyanines and oxonoles belonging to the polymethine dyes.

The known dyes have, however, either the disadvantage of effecting insufficient increase in sensitivity or of imparting too much color to the electrophotographic layer, which should generally be colorless or almost colorless. The disadvantage of coloring the layer is particularly serious in the case of electrophotographic materials because the sensitizing dyes used cannot be washed out by the usual processes or destroyed in baths. Bleaching the sensitizing dyes after the image has been produced is complicated and uneconomical.

It is an object of the invention to develop spectrally sensitized electrophotographic layers, preferably containing zinc oxide as photoconductive agent, which are as far as possible colorless and the sensitivity of which is stable in storage.

It has now been found that dyes of the General Formula I or II are eminently suitable for sensitizing electrophotographic layers, especially zinc oxide layers.

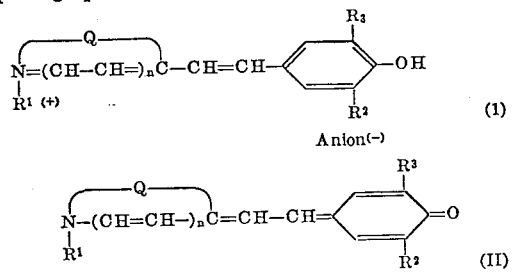

In the above Formulae I and II, $R^1$ represents either (1) a saturated or unsaturated aliphatic group having preferably up to 6 C atoms which may have e.g. halogen, phenyl, hydroxyl, amino, carboxyl, sulfo, sulfamino, sulfamoyl, carboxylamino, carbamoyl, alkoxycarbonyl, alkoxy, aroxy, carboxyalkyl, sulfato or thiosulfato substituents, (2) a cycloalkyl group such as cyclohexyl, or (3) an aryl group, especially a group of the phenyl series;

$R^2$ and $R^3$ may be identical or different and represent hydrogen, an alkyl or alkoxy group having preferably up to 5 C atoms, a trifluoromethyl group, a halogen, especially chlorine, bromine or iodine, a carboxyl group or a carbalkoxy group;

$n$ represents 0 or 1;

Anion$^{(-)}$ represents any anion, e.g. a halide such as chloride, bromide or iodide, perchlorate, sulfate, methylsulfate, p-toluenesulfonate (in the following indicated as Tos$^{(-)}$ and the like; the anion is absent in cases where $R^1$ contains an acid group in the anionic form so that a betaine is present; and Q represents a radical required for completing a heterocyclic group having a 5-membered or 6-membered heterocyclic ring; the heterocyclic group may contain a condensed benzene or naphthalene ring and further substituents; examples are the heterocyclic groups commonly found in cyanine chemistry, for example those of the thiazole series (e.g.

thiazole,
4-methylthiazole,
5-methylthiazole,
4,5-dimethylthiazole,
4-phenylthiazole,
5-phenylthiazole,
4,5-diphenylthiazole,
5-β-carboxyvinylthiazole,
benzothiazole,
4-chlorobenzothiazole,
5-chlorobenzothiazole,
6-chlorobenzothiazole,
7-chlorobenzothiazole,
6-bromobenzothiazole,
5-iodobenzothiazole,
6-iodobenzothiazole,
4-methylbenzothiazole,
5-methylbenzothiazole,
6-methylbenzothiazole,
5,6-dimethylbenzothiazole,
4-phenylbenzothiazole,
5-phenylbenzothiazole,
6-phenylbenzothiazole,
5-hydroxybenzothiazole,
6-hydroxybenzothiazole,
4-methoxybenzothiazole,
5-methoxybenzothiazole,
6-methoxybenzothiazole,
5-ethoxybenzothiazole,
6-ethoxybenzothiazole,
5,6-dimethoxybenzothiazole,
5,6-methylenedioxybenzothiazole,
5-diethylaminobenzothiazole,
6-diethylaminobenzothiazole,
5-carboxybenzothiazole,
5-sulfobenzothiazole,
tetrahydrobenzothiazole,
7-oxotetrahydrobenzothiazole,
naphtho[1,2-d]thiazole,
naphtho[2,1-d]thiazole,
5-methoxynaphtho[2,1-d]thiazole,
5-ethoxynaphtho[2,1-d]thiazole,
7-methoxynaphtho[2,1-d]thiazole,
8-methoxynaphtho[1,2-d]thiazole, etc), those of the selenazole series (e.g.)

selenazole,
4-methylselenazole,
4-phenylselenazole,
benzoselenazole,
5-chlorobenzoselenazole,
5,6-dimethylbenzoselenazole,
5-hydroxybenzoselenazole, 5-methoxybenzoselenazole,
tetrahydrobenzoselenazole,
naphtho[1,2-d]selenazole, or
naphtho[2,1-d]selenazole), those of the oxazole series (e.g.

oxazole,
4-methyloxazole,
4-phenyloxazole,
4,5-diphenyloxazole,
benzoxazole,
5-chlorobenzoxazole,
6-chlorobenzoxazole,
5,6-dimethylbenzoxazole,
5-phenylbenzoxazole,
5-hydroxybenzoxazole,
5-methoxybenzoxazole,
5-ethoxybenzoxazole,
6-dialkylaminobenzoxazole,
5-carboxybenzoxazole,
5-sulfobenzoxazole,
5-sulfonamidobenzoxazole,
5-β-carboxyvinylbenzoxazole,
7-oxa-4,5,6,7-tetrahydrobenzoxazole,
naphtho[1,2-d]oxazole,
nahptho[2,1-]oxazole, or
naphtho[2,3-d]oxazole), those of the imidazole series (e.g.

1-methylimidazole,
1-ethyl-4-phenyl-imidazole,
1-butyl-4,5-dimethylimidazole,
1-methylbenzimidazole,
1-butyl-4-methylbenzimidazole,
1-ethyl-5,6-dichlorobenzimidazole,
1-ethyl-5-trifluoromethylbenzimidazole,
1-methylnaphtho[1,2-d]imidazole, or
1-ethylnaphtho[2,3-d]imidazole), those of the 3,3-dialkyl-indolenine series (e.g.

3,3-dimethylindolenine,
3,3,5-trimethylindolenine
3,3-dimethyl-5-methoxyindolenine, etc.), those of the 2-pyridine series (e.g.

pyridine,
3-methylpyridine,
4-methylpyridine,
5-methylpyridine,
6-methylpyridine,
3,4-dimethylpyridine,
3,5-dimethylpyridine,
3,6-dimethylpyridine,
4,5-dimethylpyridine,
4,6-dimethylpyridine,
4-chloropyridine,
5-chloropyridine,
6-chloropyridine,
3-hydroxypyridine,
4-hydroxypyridine,
5-hydroxypyridine,
6-hydroxypyridine,
3-phenylpyridine,
4-phenylpyridine,
6-phenylpyridine, etc.), those of the 4-pyridine series (e.g.

2-methylpyridine,
3-methylpyridine,
2,3-dimethylpyridine,
2,5-dimethylpyridine,
2,6-dimethylpyridine,
2-chloropyridine,
3-chloropyridine,
2-hydroxypyridine,
3-hydroxypyridine, etc.), those of the 2-quinoline series (e.g.

quinoline,
3-methylquinoline,
5-methylquinoline,
7-methylquinoline,
6-chloroquinoline,
8-chloroquinoline,
6-methoxyquinoline,
6-ethoxyquinoline,
6-hydroxyquinoline,
8-hydroxyquinoline,
5-oxo-5,6,7,8-tetrahydroquinoline, etc)., those of the 4-quinoline series (e.g.

quinoline,
6-methoxyquinoline,
7-methylquinoline,
8-methylquinoline, etc), those of the isoquinoline series (e.g.

isoquinoline or
3,4-dihydroisoquinoline), those of the thiazoline series (e.g.

thiazoline,
4-methylthiazoline, etc), and those of the pyrroline, tetrahydropyridine, thiadiazole, oxadiazole, pyrimidine, triazine or benzothiazine.

The heterocyclic groups may be further substituted in any manner, e.g. by additional alkyl groups which preferably have up to 3 C atoms, such as methoxy or ethoxy, hydroxyalkyl, alkylthio, aryl such as phenyl, or aralkyl such as benzyl, amino, substituted amino and the like.

The following are examples of suitable compounds:

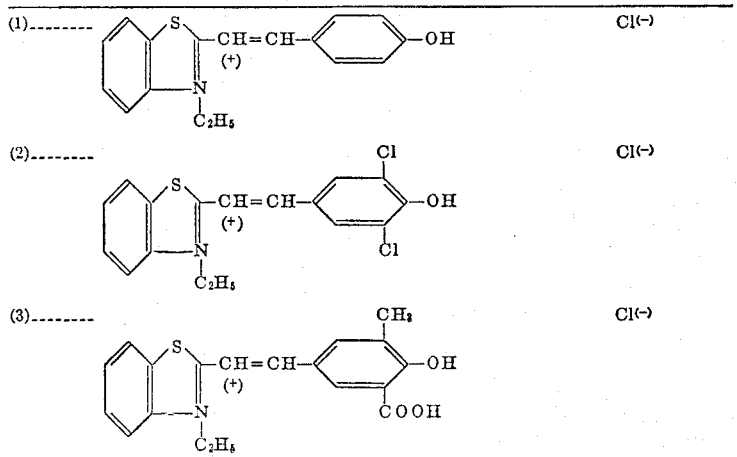

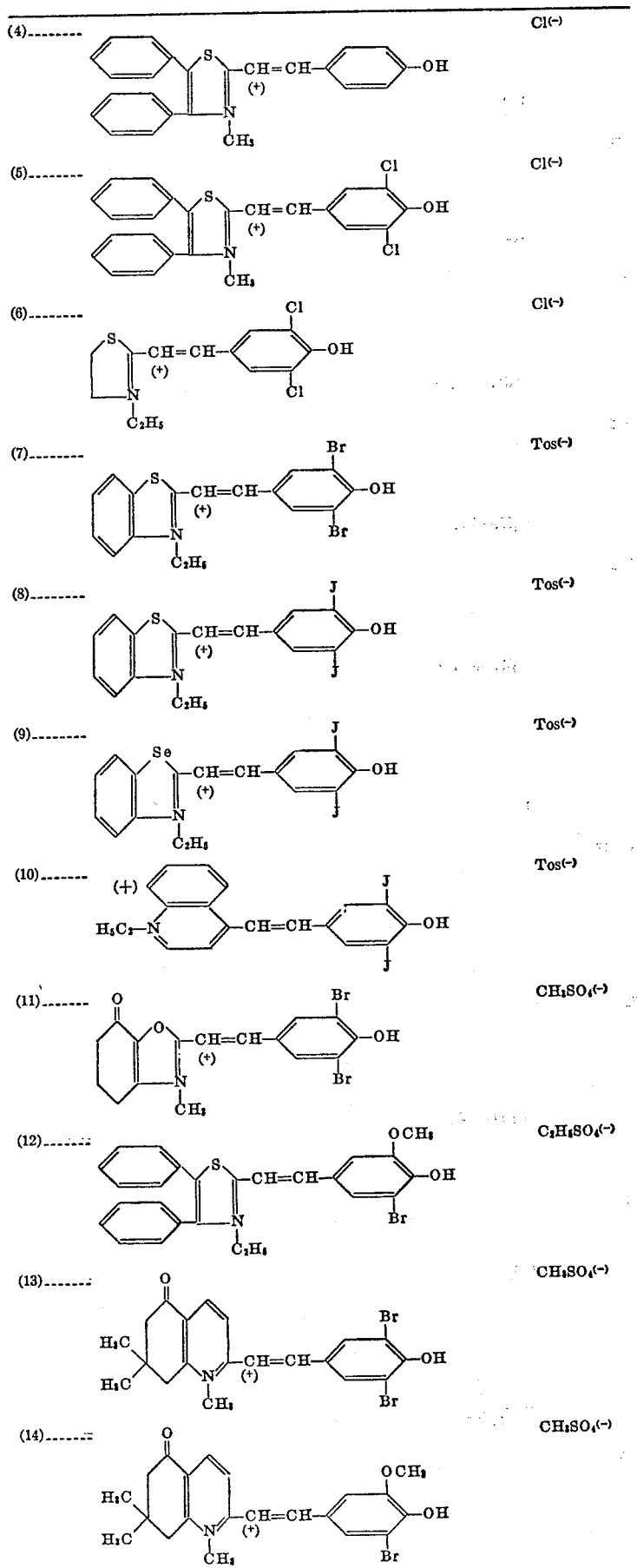

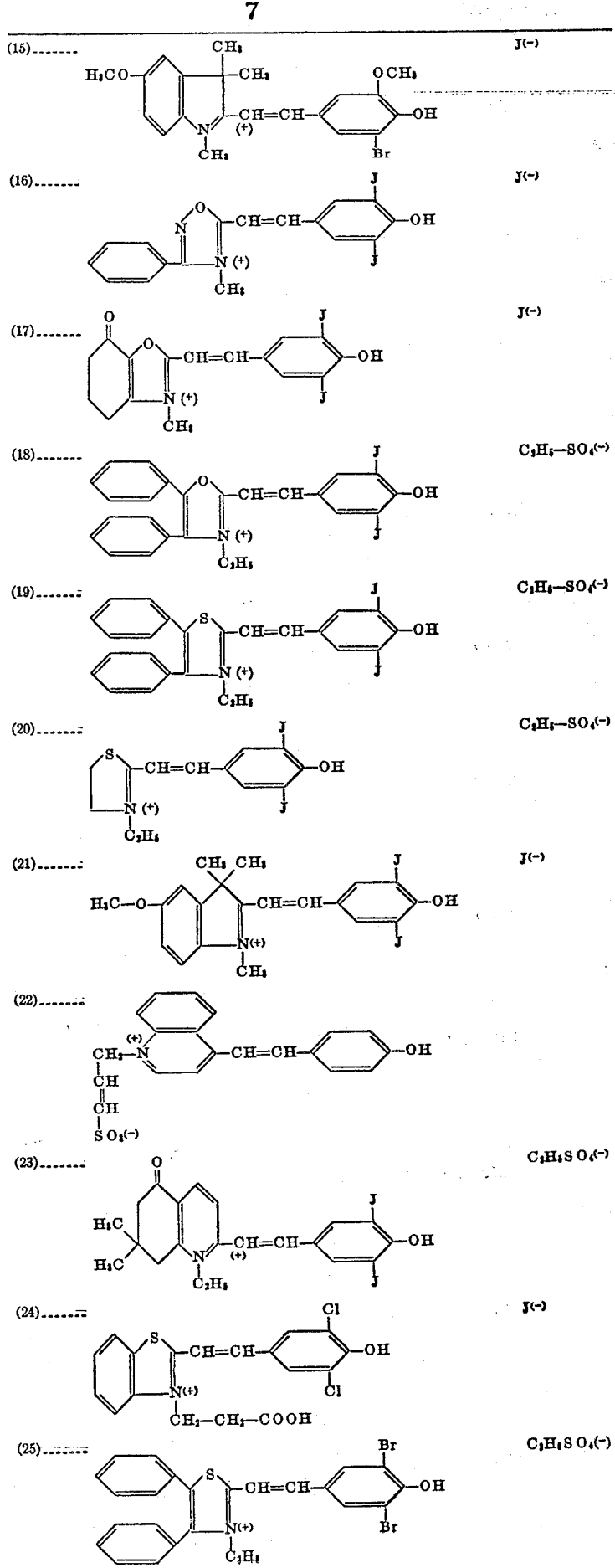

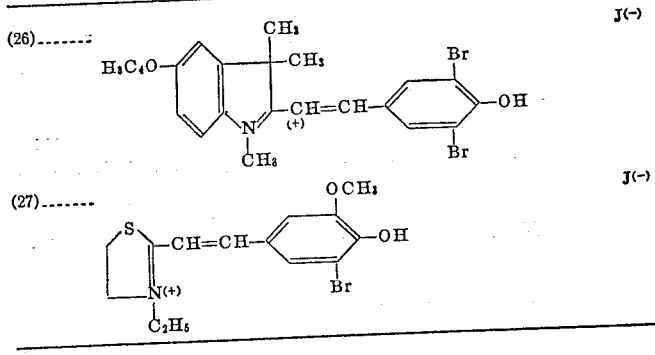

The dyes may be prepared by condensation of 2-methyl or 4-methyl-quaternary salts of heterocyclic bases with the corresponding 4-hydroxybenzaldehydes in solvents such as alcohol, pyridine or glacial acetic acid, optionally with the addition of a base such as triethylamine or piperidine. Depending on the conditions under which condensation is carried out, the dyes are obtained either in the form of salts I or quinoids II. The quinoids are obtained from the salt form by the addition of bases and, conversely the quinoids can be converted into the salt form by treatment with acids (see F. M. Hamer, The Cyanine Dyes and Related Compounds, Interscience Publishers, 1964, p. 592 et seq.). It is immaterial in which form the dyes are added to the electrophotographic layers for the purpose of sensitizing them.

The preparation of Compound 2 is described in detail below and the other compounds are obtained in a similar manner.

COMPOUND 2

3.5 g. (0.01 mol) of 2-methyl-3-ethyl-benzothiazolium tosylate are heated on a steam bath for 15 minutes together with 1.9 g. (0.01 mol) of 3,5-dichloro-4-hydroxybenzaldehyde in 10 ml. of alcohol with the addition of 1.5 ml. of piperidine. The solution is cooled and the dye is precipitated with hydrochloric acid, isolated by suction filtration and recrystallized from alcohol. Yield 2.6 g., M.P. 267–269° C.

The dyes according to the invention are especially suitable for the spectral sensitization of inorganic photoconductive agents, especially zinc oxide, which are dispersed in binders. The binders used for this process may be any of the usual film-forming substances used in electrophotography, for example silicone resins, alkyd resins, polyurethanes or polyvinyl acetate. The dyes are generally added in solution to the dispersions of inorganic photoconductive substances which are to be sensitized. The methods used for this are generally known to the expert.

The optimum quantity of sensitizing dye can be determined by simple tests. The quantities used are generally between 0.01 and 5 mg. of dye per gram of zinc oxide. The proportion of zinc oxide to binder may vary within wide limits and is preferably 1 part by weight of zinc oxide to between 0.1 and 0.6 part of binder. The thickness of the photoconductive layer may also vary within wide limits according to the purpose for which it is to be used, satisfactory results being generally obtained with layers of between 1 and 20μ, preferably between 3 and 10μ thick.

The photoconductive layers may contain, in addition to the dyes according to the invention, the photoconductive substances and the binders, other spectral sensitizers (see e.g. British Pat. 1,020,504) and substances for adjusting the viscosity, or agents which protect against ageing or pigments (see British Pat. 1,007,349) or substances such as those described in Belgian Pat. 612,102.

The photoconductive materials according to the invention may be used for any electrophotographic process, for example for development processes in which a solid, finely-divided, toner powder is used, aerosol development processes, electrophoretic processes, so-called wetting development processes and the like. The materials according to the invention are suitable both for processes using electrostatic images and processes using conductive images.

EXAMPLE 100 mg. of a dye in the form of a 0.1% solution in dimethyl formamide are added to a mixture comprising:

20 g. of photoconductive zinc oxide,
20 ml. of toluene,
11 ml. of ethyl acetate,
0.66 ml. of a 10% solution of tetrachlorophthalic acid anhydride in alcohol, and
4.5 g. of a 50% solution of a copolymer of vinyl acetate, acrylic acid ester and acrylic acid (percent by weight 87:12:1) in a mixture of toluene, 1,2-dichloroethane and ethyl acetate (percent by volume 1:1:4).

The mixture is applied to a baryta paper support (25 g. of zinc oxide per m.²) and dried. The resulting electrophotographic material is charged and then exposed through a step wedge (density difference 0.1) for 15 seconds, using a 4.50 watt incandescent lamp with a luminous intensity of 2280 lux, and the material is then developed by one of the usual development processes using a toner powder. The sensitivity of the layers is indicated by the number of steps at which no toner particles are precipitated and at which therefore the original density of the material is preserved. The larger the number of steps, the higher is the sensitivity.

| Dye: | Number of steps |
|---|---|
| None | 9 |
| 1 | 21 |
| 2 | 24 |
| 3 | 26 |
| 4 | 21 |
| 5 | 22 |
| 6 | 21 |
| 7 | 26 |
| 8 | 23 |
| 9 | 26 |
| 10 | 25 |
| 12 | 25 |
| 13 | 23 |
| 14 | 25 |
| 15 | 27 |
| 16 | 21 |
| 18 | 22 |
| 19 | 22 |
| 20 | 22 |
| 21 | 27 |
| 23 | 23 |
| 25 | 24 |
| 26 | 26 |
| 27 | 20 |

What is claimed is:

1. A spectrally sensitized electrophotographic material containing a dispersed zinc oxide photoconductive agent and a sensitizer in a layer of binder, wherein the improvement comprises as a sensitizer a dye having one of the following Formulae I and II

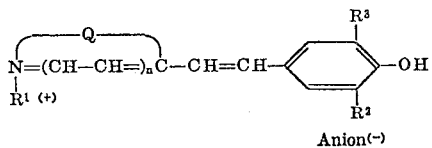

(I)

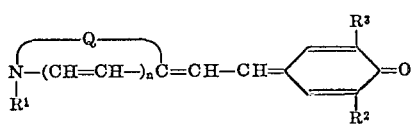

(II)

wherein
- $R^1$ = (1) a saturated or unsaturated aliphatic group having up to 6 C atoms; (2) cycloalkyl; or (3) aryl;
- $R^2$ and $R^3$ may be identical or different and represent, alkyl or alkoxy having up to 5 C atoms, trifluoromethyl, halogen, carboxyl or carbalkoxy;
- $n$ = 0 or 1;
- anion$^{(-)}$ = any anion; the anion is absent in cases where $R^1$ contains an acid group in the anionic form so that a betaine is present;
- Q = a radical required for completing a heterocyclic group having a 5-membered or 6-membered heterocyclic ring.

References Cited
UNITED STATES PATENTS

| | | | |
|---|---|---|---|
| 3,003,870 | 10/1961 | Jarvis et al. | 96—1.7 |
| 2,639,282 | 5/1953 | Sprague et al. | 96—140 |
| 3,132,942 | 5/1964 | Stewart | 96—1.7 |

NORMAN G. TORCHIN, Primary Examiner

J. L. GOODROW, Assistant Examiner